United States Patent
Kang (10) Patent No.: US 6,279,049 B1
(45) Date of Patent: Aug. 21, 2001

(54) DEVICE BAY SYSTEM FOR CONTROLLING DEVICES COUPLED TO A COMPUTER

(75) Inventor: Min-Su Kang, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/222,684

(22) Filed: Dec. 29, 1998

(30) Foreign Application Priority Data

Dec. 30, 1997 (KR) .................................................. 97-79755

(51) Int. Cl.[7] ............................. G06F 13/14; G06F 13/20
(52) U.S. Cl. ............................... 710/15; 710/18; 710/33; 710/62; 710/67
(58) Field of Search .................................. 710/1, 33, 15, 710/18, 62, 67

(56) References Cited

U.S. PATENT DOCUMENTS

| | | | |
|---|---|---|---|
| 5,649,484 | * 7/1997 | Broghammer et al. | 101/248 |
| 5,745,107 | * 4/1998 | Konomi | 345/332 |
| 5,809,311 | * 9/1998 | Jones | 395/750.01 |
| 5,839,095 | * 11/1998 | Liu | 702/122 |
| 6,055,412 | * 4/2000 | Min | 455/38.1 |

FOREIGN PATENT DOCUMENTS

| | | | |
|---|---|---|---|
| 0319211B | * 8/1995 | (EP) | H04Q/7/20 |
| 08137759A | * 5/1996 | (JP) | G06F/12/14 |

* cited by examiner

Primary Examiner—Thomas Lee
Assistant Examiner—Rehana Perveen
(74) Attorney, Agent, or Firm—Robert E. Bushnell, Esq.

(57) ABSTRACT

A device bay system having a device control key input unit is disclosed in which in order to control a device inserted in a device bay rather than relying on a mouse, a control-objective device bay is selected and is simply controlled by inputting a key switch. The device bay system having a key input unit for controlling a device, which has a device bay to which at least one device is inserted or removed, in which data, control signal and power communicates between a computer system and a device inserted into the device bay by using an IEEE 1394 or a USB under the control of a device bay controller, including a key input and display unit for generating a device control signal according to a user's key inputting, transmitting it to the device bay controller, and displaying existence or non-existence of key input, a control command and a control-objective device bay; and an interface for interfacing a signal transmitted between the key input display unit and the device bay controller.

20 Claims, 3 Drawing Sheets

Fig. 3

DEVICE BAY SYSTEM FOR CONTROLLING DEVICES COUPLED TO A COMPUTER

CLAIM OF PRIORITY

This application makes reference to, incorporates the same herein, and claims all benefits accruing under 35 U.S.C. §119 from an application entitled a *Device Bay System Having Key Input Unit For Controlling Device* earlier filed in the Korean Industrial Property Office on Dec. 30, 1997, and there duly assigned Ser. No. 97-79755 by that Office.

BACKGROUND OF THE INVENTION

1. Technical Field

The present invention relates to an apparatus which controls a device bay coupled to a computer system, and more particularly to an apparatus controlling peripheral devices mounted in a device bay which is coupled to a computer system.

2. Related Art

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect these components together. A computer system can be a desktop computer, a portable computer, or other type of computer.

The central processing unit is of ten described as a microprocessor. The microprocessor is an electronic component having internal logic circuitry handling most, if not all, the data processing in the computer system. The internal logic circuitry of microprocessors is typically divided into three functional parts known as the input/output (I/O) unit, the control unit, and the arithmetic-logic unit (ALU). These three functional parts interact together and determine the power and performance of the microprocessor. The combination of the control unit and the arithmetic-logic unit can be referred to as the central processing unit. Also, the combination of the input/output unit, the control unit, and the arithmetic-logic unit can be referred to as the central processing unit.

One example of non-volatile memory is read only memory (ROM). Information stored in non-volatile memory can remain unchanged even when there is a power failure. The information stored in non-volatile memory will stay there until it is changed. Read only memory is used to store important information such as instructions for the central processing unit. There are different types of read only memory including electrically-erasable-programmable-read-only-memory (EEPROM) chip and flash-read-only-memory (flash-ROM). The flash-ROM can also be referred to as flash memory.

Computer systems include a basic input output system (BIOS) which is an especially important program stored in read only memory. The basic input output system tests a computer every time the computer is powered on. The basic input output system can allocate a computer system's resources automatically, making adjustments needed to accommodate new hardware. Also, the basic input output system governs how system board components interact.

When the computer system is powered on, the basic input output system immediately takes control of the computer system and its components. The first duty of the basic input output system is to perform a series of diagnostic routines called the power on self test (POST) routine, which ensures that every part of the computer system's hardware is functioning properly.

Consider a booting operation for a computer system using Microsoft Windows 95 as the operating system. First, a user starts the booting process by turning on a power switch to supply power to the computer system. Next, a basic input output system (BIOS) executes a power on self test (POST) to test and initialize the computer system's components. The basic input output system is software embedded on an integrated circuit located on the computer system's main board. The basic input output system also handles low-level input/output to various peripheral devices connected to the computer system. The power on selftest is the part of the basic input output system that takes control immediately after the computer is turned on. The power on self test initializes the computer hardware so that an operating system can be booted (loaded). When the power on selftest procedure is finished, a plug and play operation is executed if it is determined that all hardware is operating normally. A specification prepared by Microsoft and Intel that presents a mechanism to provide automatic configuration capability to Industry Standard Architecture (ISA) cards thus enabling full Plug and Play in the computer is dated May 5, 1994 and is entitled, "Plug and Play ISA Specification, Version 1.0a." During the plug and play operation, the entire computer system is scanned for new hardware.

The plug and play operation is executed every time that the computer system is booted. Now the plug and play operation shall be described in detail. At first, a configuration manager, which manages the plug and play operation, checks to determine whether a bus is being used. That is, a bus enumerator, which is a special driver managing a bus, builds a database by gathering information on peripheral devices. Next, the configuration manager uses the database built by the bus enumerator to build a hardware tree structure and stores the hardware tree structure in a memory. The hardware tree structure indicates the composition of the hardware being used in the computer system.

Subsequently, the configuration manager operates drivers of each peripheral device indicated in the hardware tree structure. After the drivers of each peripheral device are operated, a resource arbitrator, which resolves conflicts among system resources, distributes system resources to each peripheral device. Here, system resources include interrupt request lines (IRQs), input/output port addresses, memory addresses, direct memory access (DMA) channels, and more.

Lastly, the configuration manager transmits information to the bus enumerator regarding details of the distribution of the system resources. The bus enumerator transmits information regarding allowed system resources to each peripheral device connected to the bus, thereby enabling the user to utilize the peripheral devices.

Next, when the execution of the plug and play operation is completed, system files used by the Microsoft Windows 95 operating system are executed to complete the booting process of the computer system. Then the booting process of the computer system is complete.

Unfortunately, the booting process can require a substantial amount of time, due in part to the time required for the basic input output system routine and the power on self test, in addition to the plug and play operation. In the above booting operation of the computer system, because the plug and play operation is performed every time the computer system is booted, regardless of whether any new hardware has been added to the computer system, the booting time can be lengthy.

A computer system has peripheral devices connected, such as a monitor and keyboard. A user might want to use additional peripheral devices, such as a mouse, modem, printer, and scanner. When a user tries to use multiple peripheral devices with a computer, it can be difficult to connect them since each peripheral typically has a unique type of connector. The user must carefully match the plug from each peripheral with a corresponding connector on the computer due to all the different connector types. Also, it can be difficult to configure the computer to communicate with all the peripheral devices due to the fact that some peripheral devices require unique types of hardware and software.

To solve the above described problems, a universal serial bus (USB) system has been developed. The universal serial bus is a basic system for connecting peripheral devices to a computer. Peripheral devices connected to a universal serial bus system are also referred to as universal serial bus peripheral devices. All USB devices are compatible with standard USB cables and standard USB connectors in order to simplify the process of connecting devices to a computer system.

A keyboard or monitor can be directly connected to a computer or a universal serial bus within the computer. Other peripheral devices can be easily connected to the computer with the use of an expanded hub built into the keyboard or monitor, or even via an independent universal serial bus. The expanded hub offers additional connection sockets, and can be connected in a hierarchical tree form. Peripheral devices may be located close to each other or can be located several meters from each other, with the use of a universal serial bus hub.

A universal serial bus is able to connect a total of 127 USB devices to one computer. The operating voltage transmitted through the universal serial bus is limited to 5 volts. Thus, peripherals connected on a universal serial bus are limited in the amount of power they can consume. A rapid data transmission rate of 12 megabits per second on the universal serial bus is one of the advantageous features of the universal serial bus.

The major advantages of the universal serial bus include the simplicity and convenience of attaching and detaching peripheral devices to the computer. The universal serial bus detects whether a device is added or removed when related information is offered from a computer. The USB devices can be added to a computer system or removed from a computer system while the computer system is on, unlike non-USB configurations, thus eliminating the need for a reboot of the computer system.

Recently, as a new type of computer environment such as a multi-media computer or home network and a new communication environment focusing on a computer gather strength, peripheral equipments have been rapidly increased which are subject to be controlled by the computer.

Accordingly, in consideration that the current 1:1 connecting way of computer and peripheral equipments has reached a saturation condition in view of extensity of peripheral equipments, a new connecting way between computer and peripheral equipments has been contrived to be sought, led by business sectors related to computer, telephone and monitor.

Resultantly, a universal serial bus (hereinafter, termed as 'USB') standard for transmitting a middle and low speed data and an IEEE1394 standard for transmitting a high speed data come front as a new communication protocol for the computer, while a device bay employing the USB and the IEEE1394 is considered to be taken as a new connecting medium between the computer and the peripheral equipments. The IEEE 1394 standard was developed in conjunction with the Institute of Electrical and Electronics Engineers, Inc.

Namely, the USB and the IEEE1394 are new communication protocol with a notion of hot plugging or hot plug-and-play which are being supported by the business sector of a personal computer system or a computer system, a telephone and a monitor relevance.

The main reason of the advent of the USB and the IEEE1394 would be based on the fact that, faced with the situation that various peripheral equipment attached to a computer system are increased according to an increase of applied programs, it needs to overcome such limited situation that the computer system has to cover, for which the connectors of peripheral equipments in different shapes need to fit, to thereby attain a convenience in user's computer system operation.

The USB is applied to the middle and low speed equipment of which data transmitting speed is below 12 megabits per second (mbps) such as various modem, printer, joystick, mouse, key board and scanner. The IEEE1394 is applied to a high speed equipment of which data transmitting speed is around 100–400 megabits per second (mbps) such as a digital camera, video cassette tape recorder, optical disk reproducer.

The device bay system generally refers to a system which is capable of inserting and removing device without opening chassis of the main body of the computer system in case that a user desires to add a device such as a peripheral equipment of computer system or upgrade a function.

That is, the device bay system signifies a system which has the same notion as a video cassette tape recorder (VCR) so that the device of a computer system can be inserted or removed like a video tape is inserted or withdrawn into and out from a video cassette recorder.

The device bay can be inserted into the computer system or may exist separately.

For accomplishing the function, the device bay system is subject to give and take data and control signal and power by using the IEEE1394 and the USB as a communication means between the device and the computer system.

Accordingly, future users will be able to use any multi-media environmental peripheral equipments by connecting them to the computer system by using the USB, the IEEE1394, and the device bay even without any advance knowledge.

Meanwhile, in order to control the device bay, a device bay controller including the IEEE1394 and the USB interface is required.

I have found that there is a need for an apparatus to effectively and conveniently control a device in a device bay coupled to a computer system.

SUMMARY OF THE INVENTION

An object of the present invention is to provide a device bay system having a device control key input unit in which in order to control a device inserted in a device bay rather than relying on a mouse, a control-objective device bay is selected and is simply controlled by inputting a key switch.

In order to attain the above object, there is provided a device bay system having a key input unit for controlling a device, which has a device bay to which at least one device is inserted or removed, in which data, control signal and power communicates between a computer system and a device inserted into the device bay by using an IEEE1394 or a USB under the control of a device bay controller, including a key input and display unit for generating a device control signal according to a user's key inputting, transmitting it to the device bay controller, and displaying existence or non-existence of key input, a control command and a control-objective device bay; and an interface for interfacing a signal transmitted between the key input display unit and the device bay controller.

To achieve these and other objects in accordance with the principles of the present invention, as embodied and broadly described, the present invention provides an apparatus, comprising: a receiving unit receiving a first electronic device, transmitting power to the first device, and conveying data to and from the first device; a control unit being coupled to said receiving unit and controlling the first device in accordance with a device control signal; an input unit being coupled to said control unit and having a display system and a plurality of keys, said input unit generating said device control signal according to said keys being input by a user and then transmitting said device control signal to said control unit, said display system of said input unit displaying a status of said plurality of keys and a plurality of control commands available to the user; and an interface unit coupling a computer system with said receiving unit and enabling the data to be conveyed between the computer system and the first device received by said receiving unit.

To achieve these and other objects in accordance with the principles of the present invention, as embodied and broadly described, the present invention provides an apparatus, comprising: a receiving unit receiving a first electronic device, transmitting power to the first device, and conveying data to and from the first device; an input unit having a display system and a plurality of keys, said input unit generating a device control signal according to said keys being input by a user and then transmitting said device control signal to control the first device received in said receiving unit, said display system of said input unit displaying a status of said plurality of keys and a plurality of control commands available to the user; and an interface unit coupling a computer system with said receiving unit and enabling the data to be conveyed between the computer system and the first device received by said receiving unit.

To achieve these and other objects in accordance with the principles of the present invention, as embodied and broadly described, the present invention provides a method, comprising: receiving a first electronic device into a receiving unit, transmitting power to the first device, and conveying data to and from the first device; generating a device control signal according to a plurality of keys being input by a user and then transmitting said device control signal to control the first device received in said receiving unit, said display system of said input unit displaying a status of said plurality of keys and a plurality of control commands available to the user; and coupling a computer system with said receiving unit and enabling the data to be conveyed between the computer system and the first device received by said receiving unit.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention re illustrated, which together with a general description of the invention given above, and the detailed description given below serve to exemplify the principles of this invention.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

If a digital versatile disk (DVD), a kind of IEEE1394, is inserted to a bay of the device bay controller, the computer system controls operation of the digital versatile disk (DVD) such as 'PLAY' or 'STOP', or 'PAUSE' as an applied programs of a Microsoft Windows(R) operating system, for which a user interface is commonly made by a mouse.

That is, when a user selects a control menu displayed on the screen of the display apparatus of the control system by using a mouse, a select signal is transmitted to the control system through a USB hub. Upon receipt of the select signal, the computer system transmits a control command corresponding to the selected menu to the digital versatile disk (DVD) inserted in the device via the USB hub so as to control it.

However, the device bay system as constructed above has a disadvantage in that after the user should drive the applied program, he needs to selectively click the control command displayed on the screen of the display apparatus as a menu by using the mouse.

In addition, in order to drive and control the device inserted in the bay, an additional input unit needs to be driven, causing a necessity of an additional applied program, resulting in that the overall system is more burdened. I have found that there is a need for an apparatus to effectively and conveniently control a device in a device bay coupled to a computer system.

Figure 1:
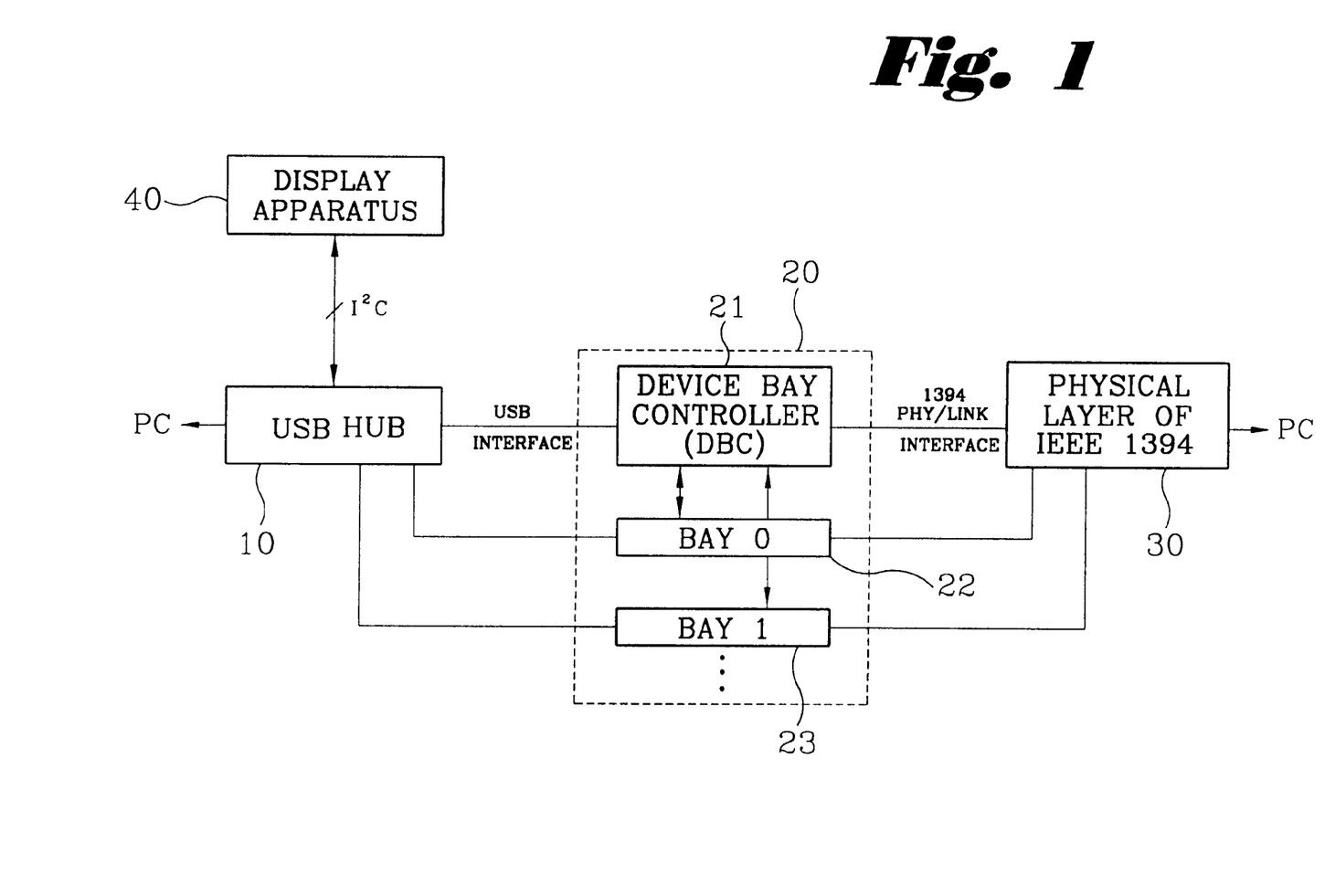
FIG. 1 is a schematic block diagram illustrating a device bay system.

FIG. 1 is a schematic block diagram illustrating the device bay system as described above. As shown in this drawing, the device bay system includes a device bay system 20 having at least a bay 22 and 23 and a device bay controller for controlling a state of the bay 22 and 23; a USB hub being interfaced with the device bay system 20 under the function of a controller itself which is generally called as 'USB hub controller', serving as a medium in communicating the device which is inserted or removed into or from the bay 22 and 23 with a computer system at a middle or low speed, and giving or taking data to or from a display apparatus 40 in an inter-integrated circuit (IIC) method; and a physical layer 30 of IEEE1394 being interfaced with the device bay system 20, and serving as a medium in high speed communicating between the device and the computer system.

Function and operation of each element of the device bay system having above construction will now be described. At the bay 22 and 23 of the device bay system 20, devices such as peripheral equipments of the computer system are inserted or removed.

The device bay controller 21 transmits information whether the device was inserted or removed to the USB hub 10 for rendering hot-plugging of the inserted device, and controls supply of power in accordance with insertion or removal of the device, and then temporarily stores the result of the operation at a register. In addition, the device bay controller 21 interfaces the communication between the USB hub 10 and the physical layer 30.

The USB hub 10 has a port to which a middle and low-speed data transmitting device (hereinafter, termed as 'USB device') is mounted, so that the USB device inserted to a specified bay of the device bay system 20 or device mounted to the port can communicate with the computer system or other peripheral equipments thereof. The USB hub also has a hub controller.

The physical layer 30 of the IEEE1394 transmits a signal through an IEEE1394 signal transmitting line so that the high-speed data transmitting device inserted to a specified bay of the device bay system 20 can communicate with the computer system or its peripheral equipments, which has a port to which the IEEE1394 device as well as the device bay system 20.

The display apparatus 40 displays an image signal transmitted from the computer system through the USB HUB 10 on a screen. An operation of the device bay system which is interfaced with the USB hub as constructed above will now be described.

In case that the USB device or the IEEE1394 device is inserted to the bay 22 and 23, a corresponding signal is transmitted to the device bay controller 21. Upon receipt of the signal, the device bay controller 21 generates a device insertion signal and transmits it to the USB hub 10 through the USB interface logic, and the USB hub 10 transmits a corresponding signal to the computer system.

The computer system which received the device insertion signal recognizes that the device is inserted and transmits a command data such as a device locking that makes it hard for the device to be removed readily from the bay 22 and 23 through the USB hub 10.

Upon receipt of the command data from the computer system, the device bay controller 21 supplies a power to the device inserted to the bay 22 and 23, and stores data indicating the state of the bay 22 and 23 at the device bay register logic unit (not shown), which is a temporary memory device.

In that way, the device is completed to be normally inserted to the bay 22 and 23 to be operated (hot plugging), and thereafter, the USB device or IEEE1394 device mounted at the bay 22 and 23 directly communicates with the computer system through the physical layer 30 of the IEEE1394 and the USB hub 10 so as normally operated, not through the device bay controller 21.

For example, if a digital versatile disk (DVD), a kind of IEEE1394, is inserted to the bay '0' 22, the computer system controls operation of the digital versatile disk (DVD) such as 'PLAY' or 'STOP', or 'PAUSE' as an applied program on window, for which a user interface is commonly made by a mouse.

That is, when a user selects a control menu displayed on the screen of the display apparatus by using a mouse, a select signal is transmitted to the computer system through the USB hub 10. Upon receipt of the select signal, the computer system transmits a control command corresponding to the selected menu to the digital versatile disk (DVD) inserted in the bay '0' 22 via the USB hub 10 so as to control it.

However, the device bay system as constructed above has a disadvantage in that after the user should drive the applied program, he needs to selectively click the control command displayed on the screen of the display apparatus as a menu by using the mouse.

In addition, in order to drive and control the device inserted in the bay, an additional input unit needs to be driven, causing a necessity of an additional applied program, resulting in that the overall system is more burdened.

Figure 2:
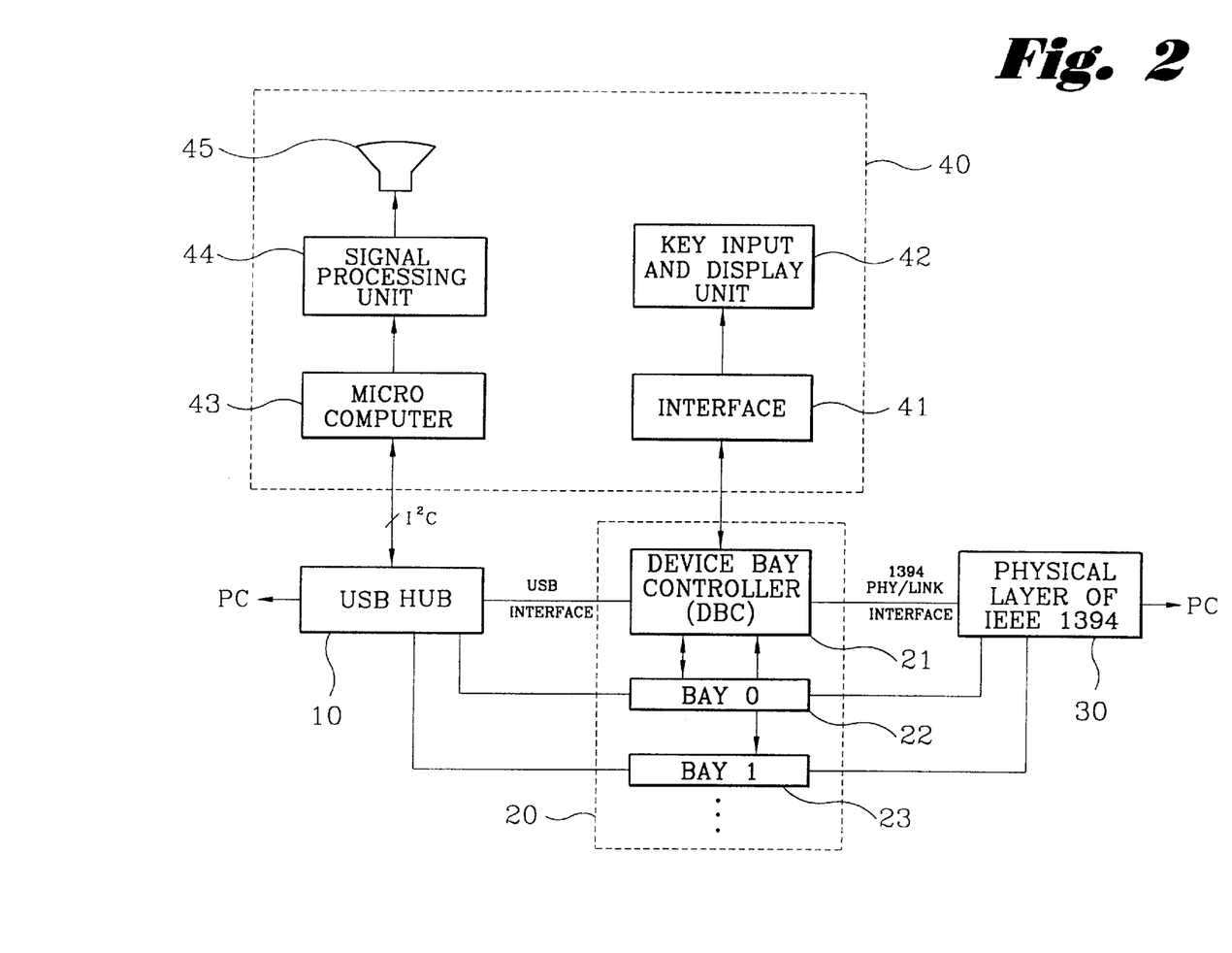
FIG. 2 is a schematic block diagram illustrating a device bay system having a key input unit for controlling device in accordance with the present invention.

A preferred embodiment of the present invention will now be described with reference to the accompanying drawings. FIG. 2 is a schematic block diagram illustrating a device bay system having a key input unit for controlling device in accordance with the present invention.

As shown in this drawing, a device bay system having a key input unit for controlling device in accordance with the present invention includes a device bay system 20 having at least one bay 22 and 23 and device bay controller 21; a USB hub 10 being interfaced with the device bay system 20 as a function of a USB hub controller, serving as a medium in a middle and low speed communication between the computer system and the device inserted to or removed from the bay 22 and 23, and giving and taking data to and from a display apparatus 40 in an inter-integrated circuit (IIC) method; and a physical layer 30 of an IEEE1394 for being interfaced with the device bay system 20 and serving as a medium in a high speed communication between the computer system and the device inserted to or removed from the bay 22 and 23.

The display apparatus 40 includes a microcomputer 43 for transmitting data to the USB hub 10 in an inter-integrated circuit (IIC) method; a signal processing unit 44 for amplifying and outputting an image signal to a signal with appropriate level for display under the control of the microcomputer 43; an image display unit 45 for displaying an image on a screen in accordance with a signal provided from the signal processing unit 44; a key input and display unit 42 for displaying the control-objective device bay and device control command, generating a device control signal according to a user's key inputting to transmit it to the device bay controller 21 of the device bay system 20, and displaying existence or nonexistence of key inputting; and an interface 41 for interfacing a signal transmitted between the key input and display unit 42 and the device bay controller 2.

As described above, the device bay system having the key input unit for device control in the present invention has the function of each elements and same construction as that of the device bay system as shown in FIG. 1 except that the present invention further includes the key input and display unit 42 and the interface 41 in the display apparatus 40.

An operation of the device bay system according to the present invention will now be described in detail.

Figure 3:
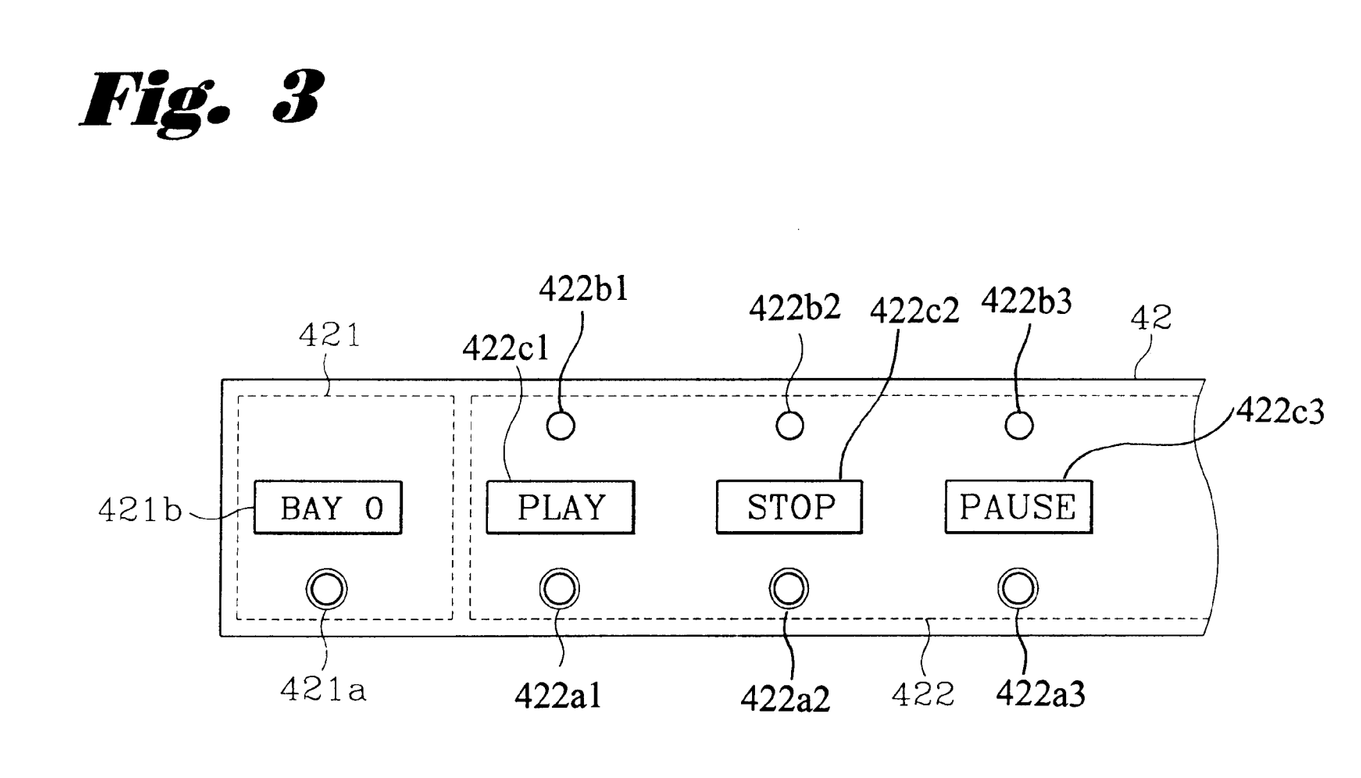
FIG. 3 shows a partial portion of a key input and display unit of FIG. 2.

FIG. 3 shows a partial portion of a key input and display unit 42 of FIG. 2. As shown in this drawing, the key input and display unit 42 includes a first key input and display unit 421 for selecting and displaying the control-objective device bay; and a second key input and display unit 422 for inputting and displaying a control command for the device bay selected and displayed by the first key input and display unit 421.

The first key input and display unit 421 includes a first key switch 421a for selecting the control-objective device bay, and a first display window 421b for displaying the control-objective device bay, which is made in the following way.

First, when an initial power is applied, a predetermined device bay is displayed like the bay '0' 22 or bay '1' 23. The predetermined device bay may be a pre-set single bay or a device bay which was finally operated beforehand.

Thereafter, in case that a device is newly inserted to an arbitrary bay, the newly inserted device bay is automatically displayed, and in case that the first key switch 421a is operated, the device bay displayed according to operation numbers of the first key switch 421a is sequentially changed.

The second key input and display unit 422 includes a plurality of second key switches 422a1, 422a2, and 422a3 for inputting at least one control command, each having different function. The second key input and display unit 422 also includes a plurality of display devices 422b1, 422b2, and 422b3 corresponding to respective key switches 422a1, 422a2, and 422a3, and being driven by the operation of the respective key switches 422a1, 422a2, and 422a3. The second key input and display unit 422 also includes a plurality of second display windows 422c1, 422c2, and 422c3, for displaying a control command corresponding to each respective key switch 422a1, 422a2, or 422a3.

With this construction, when the user operates the second key switch 422a1 to control the operation of the device inserted to the device bay 22 and 23, a device control signal is generated according to the corresponding key input and is transmitted to the device bay controller 21 by which existence or non-existence of key inputting is displayed on the corresponding display device 422b1.

The first key switch 421a and the plurality of second key switches 422a1, 422a2, and 422a3 need to perform the above-described functions, which can be accomplished by switch devices such as push-button switches. The plurality of display devices 422c1, 422c2, and 422c3 need to perform the above-described functions, which can be accomplished by light emitting diodes.

The first display window 421b and the plurality of second display windows 422c1, 422c2, and 422c3 can be accomplished by liquid crystal display (LCD) devices.

An operation of the present invention having the key input and display unit 42 will now be described with an example that the digital versatile disk (DVD) is inserted into the bay '0' 22.

First, when the digital versatile disk (DVD) is inserted into the bay '0' 22, the device bay controller 21 transmits a signal that the digital versatile disk (DVD) is inserted into the computer system through the USB hub 10.

Upon receipt of it, the computer system transmits data for displaying 'bay 0' to the first display window 421b by using an applied program of window in order to inform that the control-objective device is inserted into the bay '0' 22 through the first display window 421b of the first key input and display unit 421.

In addition, the computer system transmits data for displaying operation command of the digital versatile disk (DVD) such as 'PLAY', 'STOP' or 'PAUSE' to the second key input and display unit 422 through the device bay controller 21 of the USB hub 10, so as to be displayed on the plurality of second display windows 422c1, 422c2, and 422c3.

Upon viewing the first display window 421b, the user knows that the digital versatile disk (DVD) which the user can control is presently inserted into the bay '0', and upon viewing the plurality of second display windows 422c1, 422c2, and 422c3, the user knows the kind of the control commands that are available to control the digital versatile disk (DVD) inserted into the bay '0'.

Then, upon viewing the control commands displayed on the second display windows 422c1, 422c2, and 422c3, when the user operates one of the second key switches 422a1, 422a2, and 422a3 corresponding to a desired command, a key signal corresponding to the pertinent control command is applied.

If the user presses down the second key switch 422a1 corresponding to 'PLAY', the device bay controller 21 which received the control signal by the key switch 422a1 transmits it to the computer system through the USB hub 10.

Then, the computer system generates a control command corresponding to the 'PLAY' signal inputted from the USB hub 10 and operates the digital versatile disk (DVD) of the bay '0' 22, the control-objective device, in a reproducing mode through the USB hub 10. In this respect, the interface 41 interfaces the signal transmitted between the key input and display unit 42 and the device bay controller 21.

As shown in above, unlike in FIG. 1, since the user's interface in the present invention is accomplished by the key switches 421a, 422a1, 422a2, and 422a3, the display devices 422b1, 422b2, and 422b3, and the display windows 421b, 422c1, 422c2, and 422c3, a mouse is not necessary and there is no need for the control command to be displayed on the screen 45 of the display apparatus 40. In other words, the device bay system shown in FIG. 1 requires a mouse. However, the device bay system shown in FIGS. 2 and 3, in accordance with the principles of the present invention, does not require a mouse.

Meanwhile, the key input and display unit 42 and the interface 41 of the device bay system having the key input unit for device control according to the present invention were shown to be mounted at a predetermined portion of the display apparatus 40 in FIG. 2, which, alternatively, can be mounted at the device bay system 20.

The display windows 422c1, 422c2, and 422c3 displaying play/stop/pause can be replaced with a single display window displaying play/stop/pause.

As so far described, according to the device bay system having the key input unit for device control, the control-objective device bay is selected and displayed. And, by having the device bay system having the key input and display unit and the interface so as to control the operations of the device inserted into the bay, so that there is no need such a control command menu to be displayed on the screen of the display apparatus and the mouse anymore, resulting in simplifying its control and reducing in applied programs in number so that the whole system is less burdened.

The device inserted into the device bay does not need to be a digital versatile disk (DVD). Many other types of devices could be used in lieu of the digital versatile disk (DVD). For example, a display device could be used such as a cathode ray tube, a liquid crystal display, a gas-plasma display, a light emitting diode display, an electro-luminescent display, a field emission display, or other type of display device.

Also, other types of devices could be used. For example, a floppy disk drive, a hard disk drive, a compact disk-read only memory (CD-ROM), a compact disk-recordable (CD-R), a compact disk-erasable (CD-E), a phase change disk (PCD), a phase disk (PD), a tape drive, a removable disk hard drive, an impact dot matrix printer, a thermal inkjet printer, a piezo inkjet printer, a phase-change inkjet printer, an electrophotographic printer, a keyboard, a mouse, a joystick, a trackball, a scanner, a light pen, an eyetracker control device, a camera, a microphone, a modem, a facsimile system, or other type of computer peripheral device.

The foregoing paragraphs describe the details of an apparatus for controlling device bay, and more particularly describe the details of a device bay system having a key input unit for controlling device in which by inputting a control command for a device inserted at a control-objective bay by using a key switch, a user simply controls an operation of the device inserted into a bay rather than that by using mouse, and the control-objective bay, operation state of the key switch and control command can be viewed by user through a predetermined display apparatus.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
   a receiving unit receiving a first electronic device, transmitting power to the first device, and conveying data to and from the first device, said receiving unit further comprising a plurality of bays including a first bay, said plurality of bays respectively receiving a plurality of additional devices including the first electronic device, said first bay receiving the first electronic device;
   a control unit being coupled to said receiving unit and controlling the first device in accordance with a device control signal;
   an input unit being coupled to said control unit and having a display system and a plurality of keys, said input unit generating said device control signal according to said keys being input by a user and then transmitting said device control signal to said control unit, said display system of said input unit displaying a status of said plurality of keys and a plurality of control commands available to the user; and
   an interface unit coupling a computer system with said receiving unit and enabling the data to be conveyed between the computer system and the first device received by said receiving unit;
   said display system of said input unit further comprising a plurality of display windows including a first display window, said plurality of display windows respectively displaying said status of said plurality of keys and said plurality of control commands available to the user, said first display window selected from among said plurality of display windows indicating that said first bay receives the first electronic device.

2. The apparatus of claim 1, said interface unit further comprising:
   an Institute of Electrical and Electronics Engineers 1394 interface unit conveying data between the computer system and the first device when the first device corresponds to an Institute of Electrical and Electronics Engineers 1394 device; and
   a universal serial bus interface unit conveying data between the computer system and the first device when the first device corresponds to a universal serial bus device.

3. The apparatus of claim 1, the first device being selected from among a universal serial bus device and an Institute of Electrical and Electronics Engineers 1394 device.

4. The apparatus of claim 1, said plurality of display windows corresponding to a plurality of liquid crystal display units.

5. The apparatus of claim 1, said interface unit further comprising:
   a first unit conveying data between the computer system and the first device when the first device uses a first communication standard; and
   a second unit conveying data between the computer system and the first device when the first device uses a second communication standard, said first communication standard being different from said second communication standard.

6. An apparatus, comprising:
   a receiving unit receiving a first electronic device, transmitting power to the first device, and conveying data to and from the first device, said receiving unit further comprising a plurality of bays including a first bay, said plurality of bays respectively receiving a plurality of additional devices including the first electronic device, said first bay receiving the first electronic device;
   a control unit being coupled to said receiving unit and controlling the first device in accordance with a device control signal;
   an input unit being coupled to said control unit and having a display system and a plurality of keys, said input unit generating said device control signal according to said keys being input by a user and then transmitting said device control signal to said control unit, said display system of said input unit displaying a status of said plurality of keys and a plurality of control commands available to the user; and
   an interface unit coupling a computer system with said receiving unit and enabling the data to be conveyed between the computer system and the first device received by said receiving unit;
   said display system of said input unit further comprising a plurality of display windows respectively displaying said status of said plurality of keys and said plurality of control commands available to the user;
   said input unit including a first key selected from among said plurality of keys and also including a first display window selected from among said plurality of display windows, said first key and said first display window respectively selecting said first bay and indicating selection of said first bay.

7. The apparatus of claim 6, said input unit including a second key selected from among said plurality of keys and also including a second display window selected from among said plurality of display windows, said second key and said second display window respectively inputting a first control command for the first electronic device received in said first bay and indicating selection of said first control command, said first control command being selected from among said plurality of control commands.

8. The apparatus of claim 7, wherein the first electronic device corresponds to a digital versatile disk drive having a digital versatile disk installed therein, and said first control command corresponds to a play command causing said digital versatile disk drive to play said digital versatile disk and causing digital data to be conveyed from said digital versatile disk through said receiving unit and through said interface unit to the computer system.

9. An apparatus, comprising:
- a receiving unit receiving a first electronic device, transmitting power to the first device, and conveying data to and from the first device, said receiving unit further comprising a plurality of bays including a first bay, said plurality of bays respectively receiving a plurality of additional devices including the first electronic device, said first bay receiving the first electronic device;
- an input unit having a display system and a plurality of keys, said input unit generating a device control signal according to said keys being input by a user and then transmitting said device control signal to control the first device received in said receiving unit, said display system of said input unit displaying a status of said plurality of keys and a plurality of control commands available to the user, said display system of said input unit further comprising a plurality of display windows respectively displaying said status of said plurality of keys and said plurality of control commands available to the user, said input unit including a first key selected from among said plurality of keys and also including a first display window selected from among said plurality of display windows, said first key and said first display window respectively selecting said first bay and indicating selection of said first bay; and
- an interface unit coupling a computer system with said receiving unit and enabling the data to be conveyed between the computer system and the first device received by said receiving unit.

10. The apparatus of claim 9, further comprising a control unit being coupled to said receiving unit and controlling the first device in accordance with said device control signal.

11. The apparatus of claim 9, wherein the first electronic device corresponds to a device selected from among a digital versatile disk drive, a floppy disk drive, a hard disk drive, a compact disk-read only memory drive, a compact disk-recordable drive, a compact disk-erasable drive, a tape drive, a removable disk hard drive, and a camera.

12. The apparatus of claim 9, said interface unit further comprising:
- a first unit conveying data between the computer system and the first device when the first device uses a first communication standard; and
- a second unit conveying databetween the computer system and the first device when the first device uses a second communication standard, said first communication standard being different from said second communication standard.

13. The apparatus of claim 9, the first device being selected from among a universal serial bus device and an Institute of Electrical and Electronics Engineers 1394 device.

14. The apparatus of claim 9, wherein said first display window displays a predetermined bay when an initial power is applied, said predetermined bay being selected from among said plurality of bays.

15. A method, comprising:
- receiving a first electronic device into a receiving unit, transmitting power to the first device, and conveying data to and from the first device, said receiving unit further comprising a plurality of bays including a first bay, said plurality of bays respectively receiving a plurality of additional devices including the first device, said first bay receiving the first device;
- generating a device control signal according to a plurality of keys being input by a user and then transmitting said device control signal to control the first device received in said receiving unit, said plurality of keys being coupled to an input unit and a display system, said display system displaying a status of said plurality of keys and a plurality of control commands available to the user, said display system further comprising a plurality of display windows respectively displaying said status of said plurality of keys and said plurality of control commands available to the user, said plurality of display windows including a first display window, said first display window indicating that said first bay receives the first device; and
- coupling a computer system with said receiving unit and enabling the data to be conveyed between the computer system and the first device received by said receiving unit.

16. The method of claim 15, said first device being removable from said first bay, said first bay being formed to receive one device at a time, said one device being any one selected from among said plurality of additional devices.

17. The method of claim 15, further comprising:
- coupling an interface unit between the computer system and said receiving unit, said interface unit including a first communication unit and a second communication unit;
- conveying data through said first communication unit and between the computer system and the first device when the first device uses a first communication standard; and
- conveying data through said second communication unit and between the computer system and the first device when the first device uses a second communication standard, said first communication standard being different from said second communication standard.

18. The method of claim 15, further comprising:
- conveying data through a first communication unit and between the computer system and the first device when the first device uses a first communication standard; and
- conveying data through a second communication unit and between the computer system and the first device when the first device uses a second communication standard, said first communication standard being different from said second communication standard.

19. The method of claim 15, said first communication standard corresponding to a universal serial bus communication standard.

20. The method of claim 15, said input unit including a first key selected from among said plurality of keys and also including a first display window selected from among said plurality of display windows, said first key and said first display window respectively selecting said first bay and indicating selection of said first bay.

* * * * *